United States Patent [19]

Weir

[11] 3,819,068

[45] June 25, 1974

[54] BOOM CONVEYOR

[75] Inventor: Stanley M. Weir, Santa Clara, Calif.

[73] Assignee: FMC Corporation, San Jose, Calif.

[22] Filed: Jan. 2, 1973

[21] Appl. No.: 320,367

[52] U.S. Cl.................. 214/38 C, 198/90, 198/91, 198/106, 198/219, 214/91 R
[51] Int. Cl............................................ B65g 67/02
[58] Field of Search............ 214/38 B, 38 BA, 38 C, 214/41; 198/88, 90, 91, 99, 106, 219

[56] References Cited
UNITED STATES PATENTS

| 3,524,558 | 8/1970 | Mastracci et al.............. | 214/38 BA |
| 3,651,963 | 3/1972 | McWilliams...................... | 214/41 X |
| 3,727,777 | 4/1973 | Hanson................................ | 214/41 |

Primary Examiner—Robert G. Sheridan
Attorney, Agent, or Firm—R. S. Kelly; C. E. Tripp

[57] ABSTRACT

A boom conveyor including a longitudinally adjustable belt conveyor arranged to be adjusted for inclination relative to a loading dock area and provided with an angularly adjustable conveyor ramp at its distal end which can be inserted within a cargo container in order to facilitate the transfer of goods to or from the container. The boom conveyor is positioned between the cargo container, parked at the edge of the loading dock area, and a staging facility and it is utilized for either loading or unloading cargo into or from the cargo container. The entire boom conveyor can be moved laterally along the dock into alignment with a cargo container, and the combined movements of the boom conveyor components provide for mechanized loading of goods to or from the cargo container. Elevational control of the longitudinally adjustable belt conveyor, and the structural arrangement of the latter with the conveyor ramp to allow feed or delivery of articles at substantially floor level forms the subject matter of the present invention.

9 Claims, 7 Drawing Figures

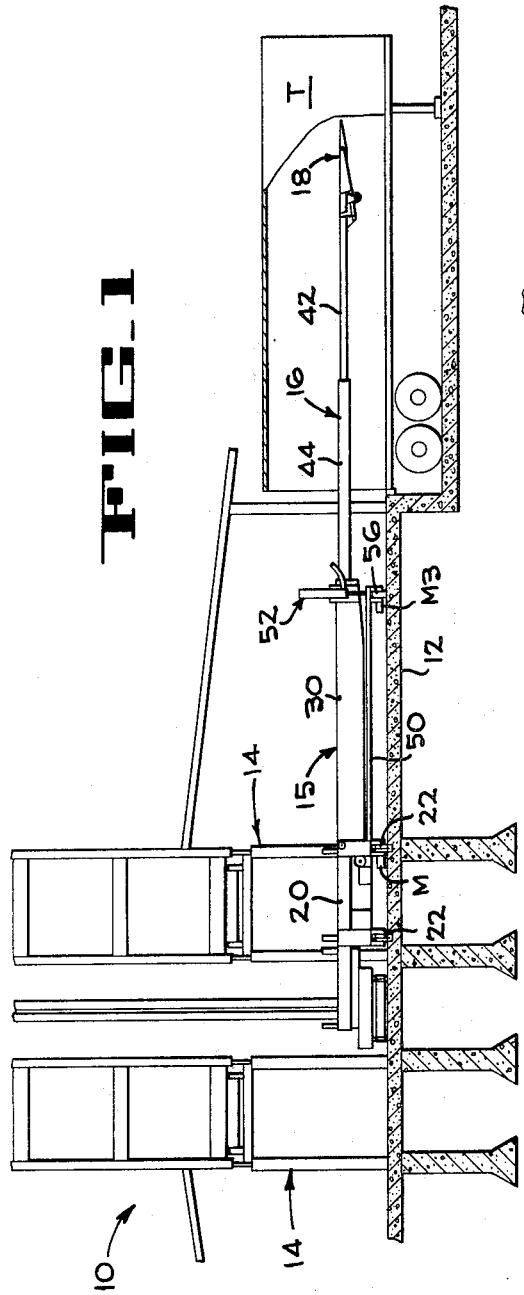
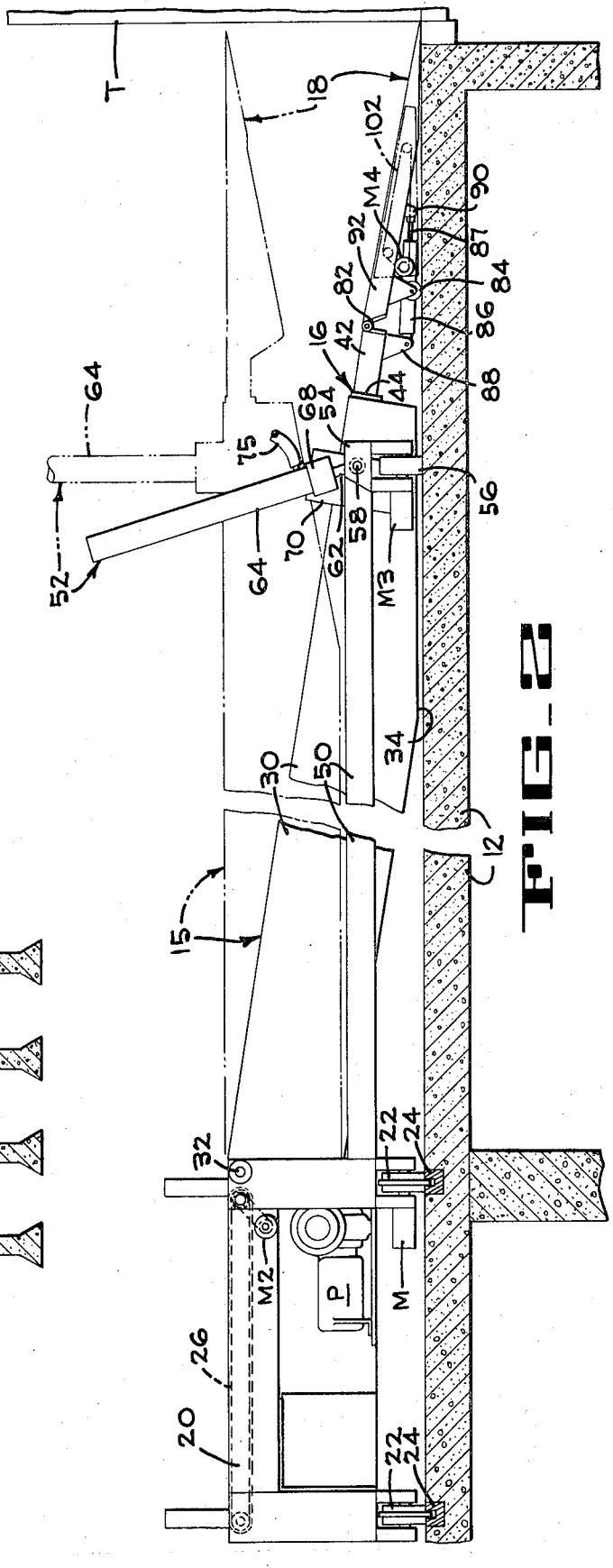

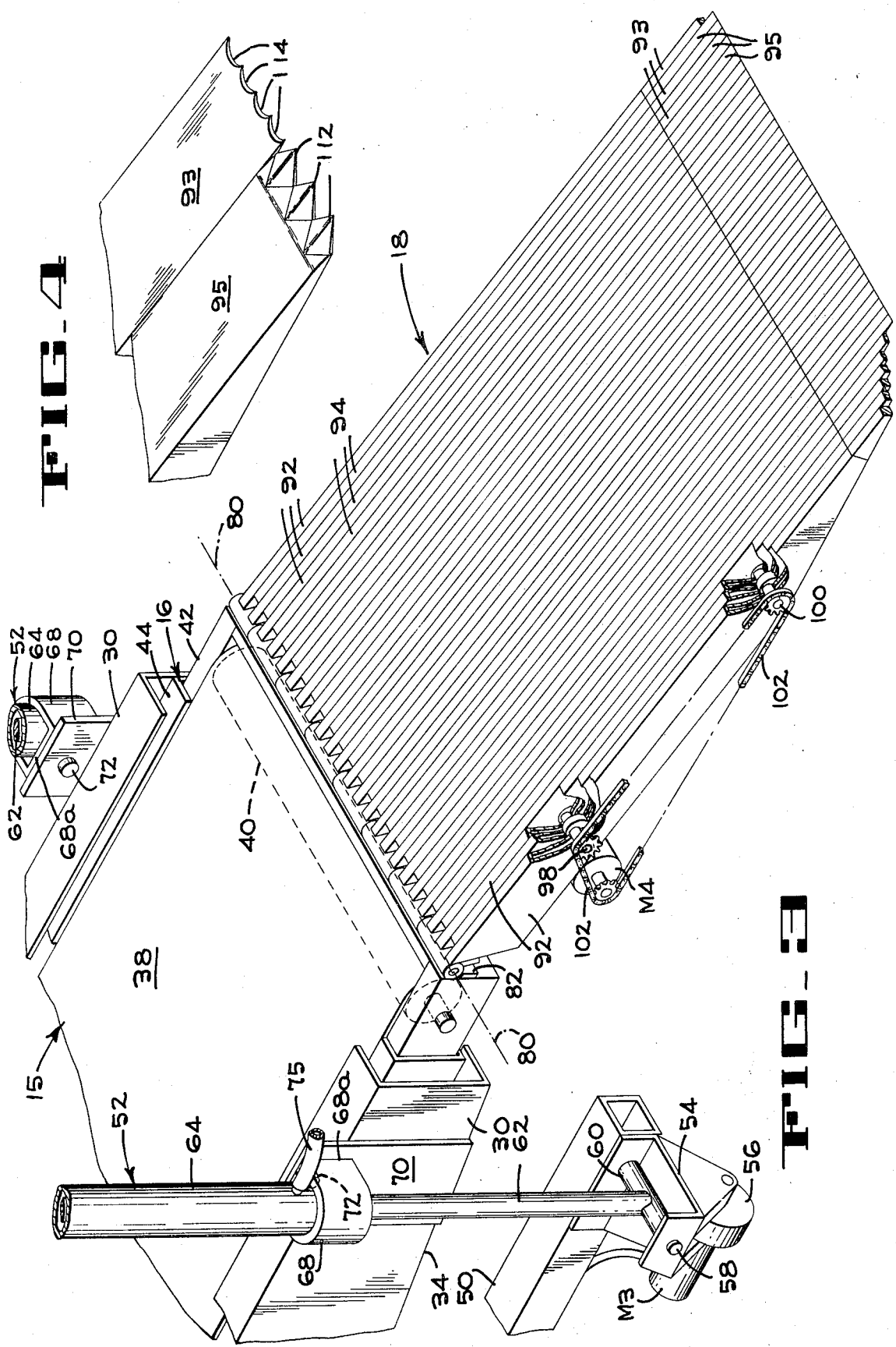

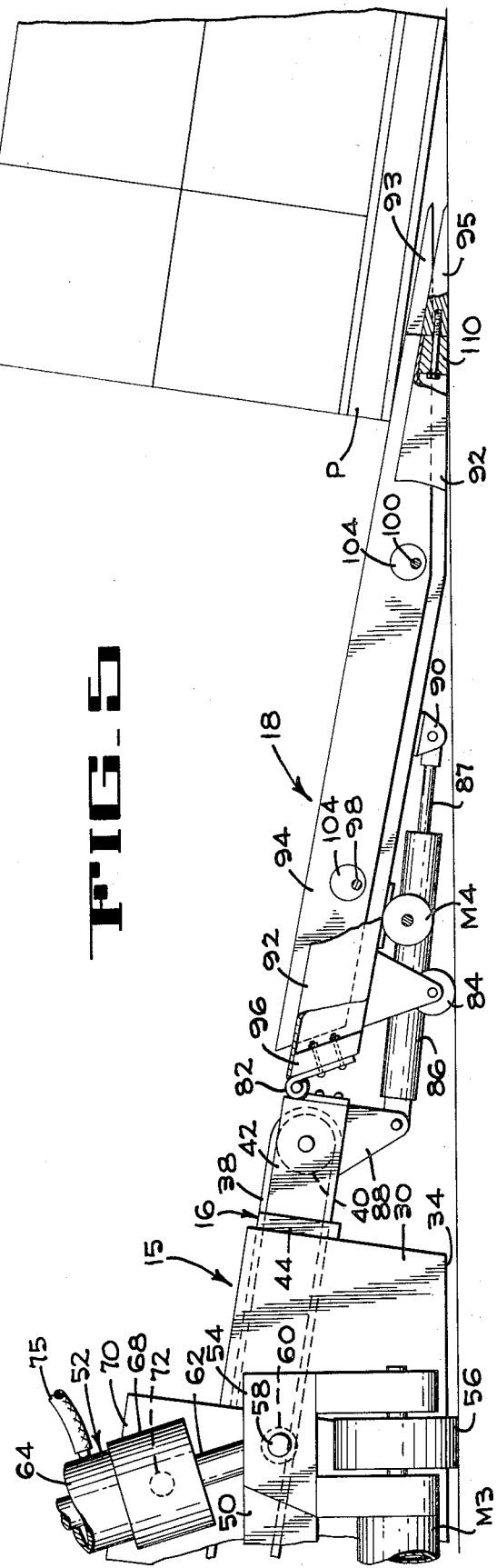
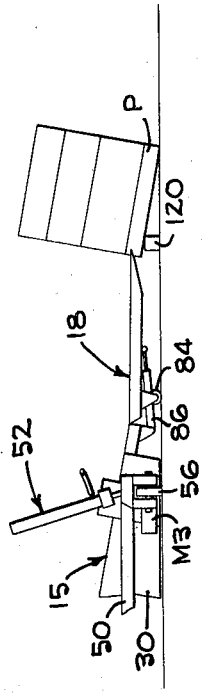

BOOM CONVEYOR

BACKGROUND OF THE INVENTION

The present invention concerns apparatus for use in an automatic freight terminal, and more specifically, it relates to a boom conveyor for transferring goods to or from cargo containers.

A pertinent prior publication disclosing both the operating environment of the present invention and an apparatus similar to that of the present invention is my prior U.S. Pat. No. 3,613,910. As disclosed in detail in this patent, two main functions of a freight terminal are to unload incoming truck trailers and to load outgoing truck trailers. This is accomplished in the patented structure by a fixed length conveyor boom which extends over a truck and trailer loading-unloading area, one end being adjacent interim storage means and the other end extending beyond the loading-unloading area into a truck trailer. This latter end of the conveyor has a conveyor ramp pivoted thereto. The trailer is parked on a platform which is movable to position the end portion of the conveyor boom and the conveyor ramp within the trailer with the ramp resting upon the floor when goods are to be picked up therefrom. Thus, the boom conveyor is moved, relative to the trailer, by shifting the trailer. After repositioning the trailer, the cargo is transferred to or from the conveyor.

A disadvantage of my patented freight terminal system is that each conveying system is fixed at a loading and unloading station, and the trailers are moved both laterally and endwise to position them for loading and unloading. That is to say, the entire trailer including contents must be moved to effect positioning for loading and unloading.

A further and more important disadvantage of the boom conveyor shown in my aforementioned prior United States patent is that it was designed to operate in a specially designed truck terminal wherein the floor of the loading area and storage means was at the same elevation as the trailer support surface. Thus, the outer portion of the boom conveyor was elevationally adjustably supported from beneath in a conventional manner, and the cantilevered free end of the conveyor was thereby provided at or near the same elevation as the floor of the trailer. However, in the conventional truck terminal the trailer support area is at a lower elevation than the loading dock platform so that the floor of the trailer will be at the same elevation as the loading dock platform wherein fork lift trucks or hand carts can be readily moved therebetween to effect manual or forklift truck loading or unloading of the cargo from the trailer. It is manifestly desirable that a boom conveyor be designed to operate in a conventional truck terminal as aforedescribed, and this means that the cantilevered end of the conveyor must be elevationally adjustably supported so that it can operate on cargo at the floor of the trailer directly adjacent to the loading dock platform. With the elevational support for the boom conveyor of the prior art, which supported the conveyor from beneath, the conveyor would have to be supported at a position spaced back from the end of the loading dock since a certain horizontal distance would be needed to permit the conveyor to reach the floor level. Such an arrangement often unduly limited the maximum permissible length of the cantilevered portion of the boom conveyor within the trailer for a conveyor of a given load-carrying capacity since a portion of the unsupported length necessarily extended for a significant distance over the loading dock platform. It can be seen that it would be highly advantageous to have the elevationally adjustable support for the boom conveyor located in a position as near to the end of the loading dock as possible so that the length of the cantilevered portion of the conveyor when fully extended is minimized, but a problem is presented in that the support means must permit the end of the conveyor to move to the floor of the dock at this support position. Elevationally adjustable supports for boom conveyors of the prior art have not provided a solution to this problem.

SUMMARY OF THE INVENTION

The present invention provides a boom conveyor which is movable laterally into alignment with a parked truck or truck trailer that remains immobile during either a loading or an unloading operation. The boom conveyor is longitudinally extendable and retractable, adjustable as to inclination, and has an angularly adjustable conveyor ramp on its free end. By the combined movements of the conveyor boom and conveyor ramp, this conveying system facilitates loading and unloading of cargo from a truck, truck trailer or other transportable container. As a result of the same combined movements, cargo being loaded into a container can be spotted and stacked.

Thus, a boom conveyor according to the present invention combines the functions of a high capacity conveyor with some of the functions of a fork lift truck and achieves substantial economies in time and labor.

The boom conveyor of the present invention is pivotally mounted at one end and the other end thereof is elevationally adjustably supported in a position directly adjacent to the container to be loaded or unloaded. A cantilevered end portion of the boom conveyor extends outwardly from the adjustable support and into the container. It is an important feature of the present invention that the adjustable support means supports the boom conveyor in a manner whereby the conveyor surface can be moved close to the supporting floor surface of the loading dock at the location of the adjustable support means so that the conveyor can be readily moved into lift engagement with an article positioned in a container close to the edge of the loading dock. That is to say, the vertically adjustable end of the boom conveyor is provided with a low-profile vertically adjustable support means which permits the boom conveyor to operate effectively with a minimum of available loading dock space.

BRIEF DESCRIPTION OF THE DRAWINGS

FIG. 1 is a diagrammatic side elevation of the boom conveyor of the present invention in its operating environment.

FIG. 2 is a diagrammatic enlarged elevation, partly broken away, of the boom conveyor shown in FIG. 1 in a lowered and retracted position and illustrating, in phantom lines, the elevated position of the boom conveyor.

FIG. 3 is an isometric view, diagrammatic and partly broken away, of the end portion of the boom conveyor shown in FIG. 2.

FIG. 4 is an enlarged isometric view of two adjacent members of the ramp conveyor shown in FIG. 3.

FIG. 5 is an enlarged diagrammatic side elevation of the ramp conveyor and the end of the conveyor boom with portions thereof being broken away and in section.

FIGS. 6 and 7 are diagrammatic views illustrating two different operational conditions of the boom conveyor of the present invention.

DESCRIPTION OF THE PREFERRED EMBODIMENT

FIG. 1 illustrates a freight terminal installation 10 which includes a trailer loading dock platform 12, interim storage facilities 14, and a boom conveyor 15 which extends from the storage facilities, across the dock platform and into the open end of a parked trailer T. Either loading or unloading of the trailer can be carried out with the boom conveyor which is provided with a plurality of telescoping conveyor extension sections in order to position a ramp conveyor 18, hinged to its free end, at any position within the trailer.

It should initially be noted that the boom conveyor 15 with extensible sections 16 may be comparable to the extensible-retractable conveyors that are marketed by the Stewart-Glapat Corporation of Zanesville, Ohio, under the trade name ADJUSTOVEYOR, and that the present disclosure is directed to a device which provides, in such a conventional extensible boom conveyor, means for pivotally mounting one end of the conveyor and means for elevationally adjustably mounting the other end of the conveyor.

With reference to FIG. 2, the elevationally fixed end of the boom conveyor 15 is connected to support frame or carriage 20 having a pair of support wheels 22 on each side thereof for laterally positioning the boom conveyor. Each pair of the laterally aligned wheels engage an underlying track 24, and one of the wheels is driven by a hydraulic motor M to effect the lateral movement of the carriage. An endless belt 26 forms the upper surface of the carriage 20 and is selectively driven by a motor M2 in either direction so that articles may be conveyed either to or from the boom conveyor.

The boom conveyor 15 includes a pair of laterally spaced frame channels 30 (FIG. 3) that are mounted at one end thereof to a pivot shaft 32 which is rotatably mounted to the carriage 20 and extends horizontally thereacross (FIG. 2). Thus, one end of the boom conveyor is pivotally mounted at a fixed elevation allowing the free end of the conveyor to be elevationally adjusted to alter the declination of the conveying surface. In order to allow maximum declination of the boom conveyor about the axis of the pivot shaft 32, each frame channel 30 is provided with a tapered lower forward edge 34 so that the upper surface of the boom conveyor, at the forward ends of the frame channels 30, lies close to the surface of the dock 12.

The upper face of the boom conveyor 15 (FIG. 3) comprises a flat conveying belt 38 that, in portions throughout the lower reach of the belt, includes vertically overlapping reaches and movable idler rollers (not shown) which provide for automatic takeup and payout of the belt when the length of the conveyor is altered by projecting or retracting the extensible sections 16. Thus, a belt roller 40 for the belt portion farthest from the carriage 20 is mounted in a frame 42 that is longitudinally slidable and nested in frame channels 44 with each pair of frame channels and the conveyor belt supported therein comprising one of the extensible sections 16. The channels 44 are longitudinally movable in the main frame channels 30. Internal power means and a drive motor, neither of which is shown, are remotely operable to either extend or shorten the length of the conveying surface (belt 38) by relative sliding movement between the members 42, 44 and 30, and the belt 38 is arranged to be driven by conventional means in either direction according to its loading or unloading function. As previously indicated, the operating principles of such an extensible boom conveyor 16 are well known and will not be described in detail herein; one such commercially available conveyor which may be utilized for the purposes of the present invention is the previously mentioned ADJUSTOVEYOR manufactured by the Stewart-Glapat Corporation.

In order to permit the low positioning of the carriage frame channels 30, as shown in FIG. 2, and yet allow for elevational control upward from that position, the carriage 20 is provided with two laterally spaced rigid beams 50, only one of which is illustrated, which beams project forwardly from the carriage along the length of the boom conveyor. The two beams 50 straddle the lowered frame channels 30 and allow free pivotal movement of the boom conveyor upward from the FIG. 2 position as controlled by a pair of hydraulic jacks 52 one of which is supported on the end of each beam 50. The mounting structure for each of the jacks, as shown in FIG. 3, includes a U-shaped bracket 54 which is secured to the outer face of the beam 50 at the end thereof. A support wheel 56 depends from the bracket 54 and is arranged for lateral rolling movement of the beam 50 with the carriage 20. A hydraulic motor M3 is coupled to one of the wheels 56 and is hydraulically connected to a master hydraulic power unit P which supplies the hydraulic fluid to synchronously power the motors M and M3 which drive one of the wheels 22 of the carriage 20 and one of the drive wheels 56 supporting the boom conveyor so as to move the carriage and boom conveyor as a unit. Extending through the upstanding ears of the bracket 54 and in vertical alignment with the wheel 56 is a pivot shaft 58 which rotatably supports a bearing tube 60. The bearing tube, in turn, is secured to the lower end of a piston rod 62 of the hydraulic jack 52. The piston rod is generally centered over the rolling axis of the wheel 56 so that the wheel provides efficient thrust reaction to the piston rod.

The tubular body of cylinder 64 of each jack 52 is provided with a rigidly attached yoke 68 at the lower end thereof which yoke has a flat inner wall 68a (FIG. 3) abutting an upstanding plate 70 that is rigidly secured to the adjacent conveyor side frame channel 30. The yoke 68 is loosely received about the enlarged head of a short pivot shaft 72 that extends through an aperture in the plate 70 and is secured thereto so that the cylinder 64 can pivot about the axis of the pivot shaft. Such pivoting occurs, as shown in FIG. 2, when the hydraulic jacks 52 are provided with fluid through inlet lines 75 to project their respective cylinders 64 and thus elevate the boom conveyor 15.

It is preferable that the hydraulic cylinders 64 have an overall length sufficient to position the upper surface of the boom conveyor 15 above the horizontal plane. Thus, the boom conveyor is capable of receiving articles from or delivering articles to the upper portion of a stack of articles in the truck trailer T.

The free end of the boom conveyor 15 (FIG. 3) carries the forwardly extending ramp conveyor 18 which is angularly adjustable about the axis 80 of a hinge 82 which connects the ramp conveyor to the forward end of the frame member 42 of the boom conveyor. The ramp conveyor 18 is generally similar to the ramp conveyor disclosed in my aforementioned prior United States patent (reference to which may be had for the specific structural details thereof) except for underlying support rollers 84 (one only being shown in FIGS. 2 and 5) that facilitate longitudinal extension or retraction of the boom conveyor by supporting the ramp conveyor upon the trailer floor or the surface of the dock.

Pivotal movement of the ramp conveyor 18 about the hinge axis 80 is carried out by a hydraulically operated cylinder 86 (FIG. 5) that is remotely controlled and connected to a depending bracket 88 at the forward end of the boom conveyor frame member 42 below the hinges 82. The powered piston 87 which is received by cylinder 86 is connected to a bracket 90 depending from the ramp conveyor whereby extension of the piston in the cylinder causes changes in the inclination of the ramp conveyor. The ramp conveyor is generally comprised of a plurality of fixed tines 92 which are interdigitated with movable tines 94 (FIG. 3). Both sets of tines are preferably of downwardly open channel shape to conserve weight, and each fixed tine is bolted to a block 96 (FIG. 5) that is securely fastened to one leaf of the hinge 82. Spaced shafts 98 and 100 extend laterally through the fixed tines and are driven by a reversible hydraulic motor M4 through a chain and sprocket drive train 102 (FIG. 3). Circular cams 104 are eccentrically mounted on each shaft and are rotatably received in apertured portions of the movable tines 94.

With the aforedescribed arrangement, the movable tines 94 can be simultaneously driven in an orbit around the axes of the shafts 98 and 100 with the lowermost position of the movable tines being one in which their upper edges are flush with or slightly below the upper edges of the fixed tines 92. In this way an article supported upon the ramp conveyor 18 will be lifted and advanced, relative to the fixed tines, by incremental conveying movements. The leading tips 93 and 95 of the fixed and movable sets of tines, respectively, are replaceable after wear. In each case such tips are of solid, hardened metal construction bolted to a fixed inner block 110 (FIG. 5). As shown in FIG. 4, the tips 95 of the movable tines are formed to provide sharp prongs 112 that are adapted to penetrate endwise into articles such as a pallet P, as shown in FIG. 7. The tips 93 of the fixed tines may be of serrated form with recesses 114 that adapt the tips to slide under a pallet P, as shown in FIG. 6.

Coordinated control of all of the movements of the carriage 20, the boom conveyor 15, the ramp conveyor 18, and the hydraulic jacks 52 is well within the capabilities of known control systems and is preferably accomplished with a portable control box not shown that may be carried by an operator attendant. For obvious reasons, it is preferred that the control box have wireless coupling to the various aforedescribed machine elements, but an umbilical cord with terminal leads to each of the elements has a certain cost advantage and is equally useful. In either event, during an unloading operation, the boom conveyor 15 can be extended until the ramp conveyor 18 is located near a stack of articles. If the entire stack is to be transferred as a unit, the jacks 52 are actuated to drop the boom conveyor to floor level and position the ramp conveyor as shown in FIG. 2. Then, by extending the boom conveyor while the ramp conveyor 18 rolls upon its supporting rollers 84, the leading ends of the tines 92 and 94 can be forced, for example, under a pallet as shown in FIG. 6. When the ramp conveyor underlies a sufficient area of the pallet, the reversible motor M4 (FIG. 5) may be energized in a direction so as to elevate the movable tines 94 in an orbital path toward the boom conveyor thereby advancing the pallet and its stack of articles along the boom conveyor and toward the interim storage facilities 14.

On the other hand, if, for example, the palletized stack to be unloaded resists efforts to thrust the tines of the ramp conveyor 18 under the pallet, the ramp conveyor 18 (FIG. 7) can be angled upwardly and forced forwardly biting into the side of the pallet. The ramp conveyor can then be further elevated at its free end to elevate the pallet and stack and to allow manual placement of spacers 120 for temporarily supporting that edge of the stack until the ramp tines can be repositioned under the elevated pallet to initiate the aforedescribed conveying procedure.

Many other cooperative movements of the elements of the boom conveyor 15 have utility, both in loading and unloading operations. For example, individual or stacked groups of articles can be loaded upon existing stacks, or removed therefrom, by actuating the jacks 52 to elevationally adjust the discharge ends of the ramp conveyor tines 92 and 94. The same movements are, of course, useful in an unloading operation because the ramp conveyor can be moved both vertically and horizontally to bring it to the articles to be transferred. It should also be noted that the angular relationship of the ramp conveyor 18 to the conveyor belt 38 of the boom conveyor can be changed before or during operation of the apparatus should such adjustment be necessary.

From the preceding description, it is believed that it will be evident that the boom conveyor 15 of the present invention provides a highly efficient cargo loading and unloading mechanism which minimizes manual handling in loading and unloading cargo from a container such as a truck trailer. The elevation adjustment means for the free end of the boom conveyor permits the conveying surface to be lowered close to the supporting floor surface so that articles can be lifted and conveyed from a point closely spaced from such elevation adjustment means. This permits the boom conveyor to operate effectively with a minimum dock width and lessens the need for cantilevered boom sections of undue length.

Although the best mode contemplated for carrying out the present invention has been herein shown and described, it will be apparent that modification and variation may be made without departing from what is regarded to be the subject matter of the invention.

What is claimed is:

1. In a conveyor system for transferring goods between a container and a goods handling facility, a longitudinally adjustable boom conveyor having a pair of elongate parallel side frames, pivot means supporting one end of said boom conveyor above the level of the ground surface at said goods handling facility while permitting elevational movement of the opposite end portion of said boom conveyor, ground supported power means straddling said opposite end portion of said boom conveyor for elevational adjustment of the latter above the ground surface and for permitting the surface of the boom conveyor to be moved close to the ground surface at said power means, means connecting said power means to each side frame for accommodating elevational movement of said boom conveyor with said power means being supported in a fixed position relative to said ground surface, a carriage supporting said pivot means, and a pair of laterally spaced elongate arms connected to said carriage, each of said arms being laterally spaced from an adjacent side frame of said boom conveyor and having a distal end connected to said power means, said power means and said arms being in vertically unobstructing relation with said boom conveyor.

2. Apparatus according to claim 1 including a bracket connected to the distal end of each of said arms, a pivot shaft mounted in each bracket, the axes of said pivot shafts extending normal to the longitudinal dimension of said boom conveyor, and a pivot shaft mounted to each of said side frames above the adjacent bracket, said power means comprising a fluid operated cylinder interconnecting said pivot shafts at each side of said boom conveyor.

3. Apparatus according to claim 2 wherein said carriage is supported for lateral rolling movement relative to the longitudinal dimension of said boom conveyor, a support wheel for each of said brackets, and individual power means connected to at least one of said support wheels, said support wheels accommodating unitary lateral movement of said boom conveyor.

4. Apparatus according to claim 3 wherein said boom conveyor is longitudinally extensible and retractable and includes a telescopic conveying section mounted between said side frames, a ramp conveyor extending from said telescopic conveying section, a hinge interconnecting said ramp conveyor and said telescopic conveying section for relative swinging movement about a horizontal axis, and support wheels connected to said ramp conveyor for rolling movement of the latter upon said ground surface during telescopic extending movement of said boom conveyor.

5. Apparatus for moving goods across a loading dock between a goods container parked adjacent the edge of the loading dock and a goods handling facility, said apparatus comprising a boom conveyor being longitudinally adjustable with at least one extensible section, pivot means for supporting one end of said boom conveyor adjacent the goods handling facility at a fixed elevation above the surface of the loading dock and enabling elevational adjustment of the opposite free end thereof, said extensible section projection from the free end of the boom conveyor, a pair of powered jacks means supporting said free end of the boom conveyor for adjusting said boom conveyor about said pivot means to slope upwardly or downwardly therefrom, said pair of powered jack means supporting said free end of the boom conveyor at the sides thereof and enabling the conveying surface of the boom conveyor to be moved between said jack means to a position close to the surface of said loading dock at the said supporting position, a ramp conveyor pivotally connected to the extensible section at the free end of said boom conveyor for movement about a transversely horizontal axis, and support wheels connected to said ramp conveyor for rollably supporting the ramp conveyor in the goods container and enabling ready longitudinal adjustment of said boom conveyor while said ramp conveyor remains in contact with the floor surface of said goods container.

6. Apparatus according to claim 5 wherein said ramp conveyor tapers to an edge at its free end, said edge being formed by a plurality of replaceable hardened teeth cumulatively extending across the width of said ramp conveyor.

7. A boom conveyor for transferring goods across a loading dock between a fixed terminal facility and a cargo container, said conveyor comprising a longitudinally extending endless conveyor portion, means mounting one end of said endless conveyor portion at a fixed elevation for pivotal movement of the conveyor portion in a vertical plane, and power means positioned near said cargo container for mounting the other end of said conveyor portion for vertical movement, said power means comprising a pair of hydraulic power cylinders rotatably secured at each side of said other end of said conveyor portion with said conveyor portion depending from said cylinders, each of said cylinders being provided with a piston including a projecting piston rod which extends downwardly therefrom, and frame means for individually pivotally supporting the distal end of each of said piston rods upon the surface of said dock at a position closely spaced from said cargo container, said other end of said conveyor portion being movable to said dock surface between said power cylinders and their associated supporting frame means in order to bring the conveying surface of said boom conveyor close to the dock surface to permit said conveyor to receive or deposit articles at the rearward end of said cargo container directly adjacent to said dock.

8. A boom conveyor according to claim 7 wherein said conveyor portion includes at least one extensible section for permitting the selective extension of the conveyor in cantilever fashion past said power means and into said cargo container.

9. A boom conveyor according to claim 8 including a pair of longitudinally extending frame members individually connecting each of said supporting frame means to the means mounting said one end of said endless conveyor portion.

* * * * *

UNITED STATES PATENT OFFICE
CERTIFICATE OF CORRECTION

PATENT NO. : 3,819,068
DATED : June 25, 1974
INVENTOR(S) : STANLEY M. WEIR

It is certified that error appears in the above-identified patent and that said Letters Patent are hereby corrected as shown below:

Column 5, line 22, "hinges" should be --hinge--

Column 7, line 56, "projection" should be --projecting--

Column 7, line 57, "jacks" should be --jack--

Signed and Sealed this sixteenth Day of September 1975

[SEAL]

Attest:

RUTH C. MASON
Attesting Officer

C. MARSHALL DANN
Commissioner of Patents and Trademarks